Patented Mar. 26, 1946

2,397,146

UNITED STATES PATENT OFFICE 2,397,146

EMULSION POLYMERIZATION PROCESS

Henry B. Kellog, Union City, and William J. Sparks, Elizabeth, N. J., assignors to Standard Oil Development Company, a corporation of Delaware No Drawing. Application June 6, 1942, Serial No. 446,132

18 Claims. (Cl. 260—84.5)

This invention relates to rubbery polymers; relates especially to catalysts suitable for the polymerization of unsaturated organic compounds into rubber like bodies; and relates particularly to the polymerization of unsaturated organic compounds in emulsion form to solid rubbery polymers by the use of water solutions of Friedel-Crafts type active halides, with or without the presence of oxygen as an auxiliary catalyst.

It has been found possible to prepare rubber substances having many of the properties of natural rubber, including the capability of vulcanizing with sulfur to develop a good tensile strength, good elongation properties, and good permanent set properties, by preparing aqueous emulsions of diolefins such as butadiene, isoprene, piperylene, dimethyl butadiene, chlorprene, and the like, with or without secondary copolymerizable compounds such as styrene, acrylonitrile, methacrylonitrile and the like. These olefinic mixtures, in emulsion form, have been found to respond readily to oxygen-type catalysts such as hydrogen peroxide, potassium persulfate, sodium perborate, benzoyl peroxide, and the like, to yield valuable rubber substances. However, for many uses these products are deficient in certain physical properties.

The present invention provides a new polymerization procedure for polymerizing diolefin materials, such as butadiene and its homologues, including the substituted butadienes having up to 10 to 15 carbon atoms per molecule, either alone, or with auxiliary unsaturated copolymerizable compounds, such as styrene, acrylonitrile, the unsaturated ketones, the unsaturated esters, the vinyl naphthalenes, and the like; by the use of aqueous solutions of Friedel-Crafts catalysts, with or without the aid of the peroxide catalysts. The resulting polymers, or interpolymers, vulcanize readily with sulfur, and when vulcanized show a good tensile strength, good elongation, and other valuable properties. The resulting polymers or interpolymers are especially desirable for admixture with the ordinary emulsion polymers to yield compositions of matter suitable for curing to relatively high tensile strength materials.

Thus, the invention provides a new polymerization procedure, utilizing Friedel-Crafts type catalysts in relatively concentrated aqueous solution for the emulsion polymerization of olefinic substances. Other objects and details of the invention will be apparent from the following description.

In practicing the invention, the procedure consists broadly in emulsifying a butadiene-1,3 which may be butadiene-1,3 per se, or isoprene, or piperylene, or dimethyl butadiene, or chloroprene, or other substituted butadiene (up to 10 or 15 carbon atoms per molecule) in an aqueous medium. With the diolefinic material there may be added, if desired, such auxiliary co-reactants or a compound copolymerizable with a butadiene-1,3 in aqueous emulsion containing a single $CH_2=C<$ group as acrylonitrile, methacrylonitrile, styrene, alpha methyl styrene, para methyl styrene, alpha methyl para methyl styrene, various of the unsaturated ketones, various of the unsaturated esters, the vinyl naphthalenes, and the like. Similarly, polyolefins may be polymerized as such or interpolymerized with other auxiliary co-reactants. The olefinic material is preferably emulsified in the water in the proportion of 100 parts of olefin or olefinic mixture with from 100 to 500 parts of water. When the mixed olefinic materials are used the mixture may consist of from 90 parts to 50 parts of the diolefin with 10 parts to 50 parts of the co-reactant. The emulsion in water is preferably aided by a neutral emulsifier of which a particularly desirable emulsifier is a hydroxy polyether, such as is sold under the trade name of "Emulphor O. N."; this being a condensation product of a high molecular weight aliphatic alcohol with ethylene oxide, as is well shown in U. S. Patent No. 1,970,578. Alternatively, any neutral emulsifying agents which are not precipitated by the Friedel-Crafts type catalysts may be used. The emulsifying agent may be present in the proportion of from 0.5 part to about 20 parts, per 100 parts of the olefinic material, depending upon the emulsifying power of the agent. The emulsion is desirably facilitated and maintained by stirring.

For the polymeriaztion catalysts, those of the Friedel-Crafts type (as shown in the article written by N. O. Calloway, under the title of "Friedel-Crafts synthesis," published in the issue of "Chemical Reviews," published for the American Chemical Society, at Baltimore in 1935, in volume 17, No. 3, the article beginning on page 327, the list of Friedel-Crafts catalysts being particularly well shown on page 375), are particularly useful. Of this list, a preferred polymerization catalyst is zinc chloride, which, according to the invention is desirably present in solution in the aqueous phase in the proportion of from 10% to 70% on the amount of water used for the aqueous phase. Alternatively, other Friedel-Crafts catalysts, such as boron trifluoride may be used. If boron trifluoride is used, the aqueous phase of the polymerization mixture preferably consists of 1 molecule of boron trifluoride to about 1½ to 2 molecules of water. That is, the proportion of boron trifluoride to water may be in the ratio of from about 68 parts by weight of $BF_3$ to 27 parts of water, to as low as 34 parts of $BF_3$ to 18 parts of water.

Alternatively, other metal halides such as bismuth trichloride, beryllium chloride, tellurium chloride, stannic chloride, columbium tetrachloride and the like may be used, in concentrations ranging from 20% by weight up to 50% to as high as 70% on the amount of water.

A particularly valuable alternative catalyst is prepared by forming the double salt of a Friedel-Crafts catalyst with a peroxide, particularly boron trifluoride with hydrogen peroxide. This compound is readily prepared merely by bubbling gaseous boron trifluoride through hydrogen peroxide. Since, however, pure hydrogen peroxide is seldom available, the preferred procedure is to bubble boron trifluoride through a water solution of hydrogen peroxide to yield a mixture of the double salt of boron trifluoride with hydrogen peroxide and the double salt of boron trifluoride with water. The mixed double salts are especially effective and are conveniently prepared merely by bubbling gaseous boron trifluoride through a water solution of hydrogen peroxide, preferably until approximate saturation is reached. The ordinary 3% solution of hydrogen peroxide in water, together with the ordinary commercial boron trifluoride, is satisfactory. However, superior results are obtainable by the use of higher concentrations of hydrogen peroxide in water. This mixture is conveniently used as prepared for the making of the emulsion containing the polymerizable diolefinic material.

These catalysts as above outlined are applicable to a wide range of olefinic materials. They are useful polymerization catalysts for practically all of the diolefins, and for a wide variety of mixtures of diolefins, or diolefins and monoolefins, including mixtures containing various of the diolefins with styrene, acrylonitrile, isobutylene and the various other iso-olefins as well as various of the monoolefins; various of the unsaturated ketones; various of the vinyl compounds, including the vinyl naphthalenes; various of the unsaturated esters and the like.

There is desirably present also one or more of the several valuable modifiers such as the mercaptans, xanthogen disulfides, sulfuric acids and the like, or an aliphatic mercaptan such as dodecyl mercaptan, tetradecyl mercaptan, and the like, which serve to improve the properties of the polymer.

The Friedel-Crafts catalyst alone yields a rapid polymerization reaction, and produces a good, high quality polymerizate which vulcanizes into an excellent rubber substitute. However, valuable improvements in the quality and properties of the polymerizate are obtainable by the use, in addition to the Friedel-Crafts catalyst, of a compound capable of liberating oxygen under the conditions of the polymerization process. Such compounds include the various peroxides, the persulfates, the various perborates, and the like. The presence of these substances as auxiliary catalysts to the Friedel-Crafts catalysts improves the speed of reaction, without detracting from the qualities of the polymerizate. The auxiliary oxygen-type catalysts may be present in ratios of from 0.01 part to 2 parts per 100 parts of aqueous solution. These catalysts are useful and effective with or without the mercaptan modifiers.

EXAMPLE 1

A mixture was prepared consisting of 75 parts by weight of butadiene and 25 parts by weight of acrylonitrile, emulsified in 350 parts of an aqueous solution, consisting of 175 parts by weight of zinc chloride in 175 parts by weight of water. In this mixture there was present 7 parts by weight (2.0%), on the aqueous material, of a hydroxy polyether purchased on the market as "Emulphor O. N."; this material serving as the emulsifying agent. The mixture was held under pressure and agitated vigorously for about 24 hours at a temperature ranging from 40° C. to 42° C. At the end of the 24 hours, the pressure was released to remove any unreacted butadiene, and residual unreacted acrylonitrile was removed by passing a current of steam through the emulsion. The resulting latex-like dispersion was then coagulated by adding approximately 150 parts of a saturated brine solution and approximately 100 parts of isopropyl alcohol. The coagulate amounted to about 65% by weight of the amount of butadiene and acrylonitrile originally emulsified. The coagulate was then washed with water and again with alcohol in a kneader. The washed polymer was then dried by milling on an open roll mill. The resulting dried polymer was found to masticate easily and to be readily worked on an ordinary rubber mill. This was further manifested by a Williams plasticity of 102–0 on the gum stock.

In preparing the polymer material for test, it was compounded according to the following recipe:

| | Parts |
|---|---|
| Polymer | 100 |
| Coal tar (Barrett BRV) | 4 |
| Rosin (Hercules) FF–16 | 4 |
| Ozokerite wax | 1.5 |
| Stearic acid | 1.5 |
| Zinc oxide | 5 |
| Channel black | 45 |
| Sulfur | 1.5 |
| Altax (benzothiazyl disulfide) | 1.25 |
| D. P. G. (diphenylguanidine) | 0.25 |

This recipe is readily prepared upon the open roll mill. Samples of this compounded polymer were then cured between plates in a hydraulic press at a temperature of 287° F. (as set by live steam at a pressure of about 40 pounds per square inch) for a time interval of 45 minutes. Upon test, the cured polymer was found to have the following characteristics:

| | Lbs./sq. in. |
|---|---|
| Tensile strength | 2200 |
| Ultimate per cent elongation | 400 |

EXAMPLE 2

A second mixture of 75 parts of butadiene, 25 parts of acrylonitrile and 350 parts of an aqueous solution of 175 parts by weight of water and 175 parts by weight of zinc chloride was prepared as in Example 1, together with 7 parts of the same hydroxy polyether. To this mixture there was also added 0.1% on the aqueous material of lauryl mercaptan. This mixture likewise was held under pressure for a time interval of 24 hours at a temperature between 40° C. and 42° C. At the end of the 24 hours, the pressure was released to remove the unpolymerized butadiene, and the residual unpolymerized acrylonitrile was removed by a current of steam. The resulting stripped latex was then coagulated by the application of saturated brine and isopropyl alcohol as in Example 1. The resultant coagulate amounted to 95% by weight of the original reactants. This material was compounded according to the same recipe as in Example 1, was similarly cured, and yielded similar tensile strength and elongation properties.

These examples show the useful polymerization effect of 50% aqueous zinc chloride solution. The polymerization rate falls off somewhat with reduction in the zinc chloride concentration, but in 24 hours, if time is available, the resulting polymerizates show as good physical properties as the more rapidly prepared polymers.

EXAMPLE 3

A mixture was prepared, consisting of 75 parts by weight of butadiene, 27 parts by weight of acrylonitrile, and 300 parts by weight of a 50% aqueous solution of zinc chloride. To this mixture were added 2.5 parts by weight of "Emulphor O. N." This mixture was divided into three parts, to one of which there was added 0.3 part by weight of potassium persulfate and 4 parts by weight of Lorol mercaptan. To the second portion there was added 0.7 part by weight of Lorol mercaptan, and to the third portion there was added 0.5 part by weight of octyl mercaptan. All three portions were polymerized under pressure for a time interval of 17 hours at 40° C. The resulting conversions are shown in the subjoined Table I:

Table I

| Potassium persulfate | Catalyst modifier | Temp. 0° C. | Time, hours | Percent conversion |
|---|---|---|---|---|
| 0.3 gram | Lorol mercaptan: 0.4 gram | 40 | 17 | 68 |
| None | 0.7 gram | 40 | 17 | 50 |
| Do | Octyl mercaptan: 0.5 gram | 40 | 17 | 72 |

This table shows the effect of the various addition agents on the rate of conversion to polymer.

EXAMPLE 4

A mixture was prepared as in Example 3, consisting of 75 parts by weight of butadiene with 25 parts by weight of styrene. This mixture was combined with 300 parts by weight of a 50% aqueous solution of zinc chloride, containing 2.5 parts by weight of "Emulphor O. N." This mixture was divided into two portions, to one of which was added 0.4 part by weight of Lorol mercaptan, and to the second there was added 0.7 part by weight of Lorol mercaptan. After polymerizing, washing, drying, and curing with sulfur, results were obtained as shown in the subjoined Table II:

Table II

| Catalyst modifier | Temp. 0° C. | Time. hours | Per cent conversion | Tensile strength | Elongation | Plasticity recovery |
|---|---|---|---|---|---|---|
| Lorol mercaptan: 0.4 gram | 40 | 16 | 72 | 2,800 | 520 | 142-15 |
| 0.7 gram | 40 | 16 | 78 | 2,100 | 560 | 109-5 |

EXAMPLE 5

A mixture was prepared consisting of 10 parts by volume of piperylene emulsified with 5 parts by volume of a mixture consisting of 1 mol of boron trifluoride with $1/12$ mol of water, the emulsification being facilitated by 0.1 part by weight of "Emulphor O. N." A rapid polymerization reaction occurred to yield a latex-like emulsion of polymer. The latex was precipitated with isopropyl alcohol. The coagulate was a heavy, slightly viscous material, soluble in petroleum ether. This material was found to be reactive with sulfur in a curing reaction which yielded a useful rubber-like substance.

EXAMPLE 6

An emulsion was prepared consisting of 40 parts by weight of a solution of zinc chloride in water composed of equal parts by weight of zinc chloride and water together with 0.1 part by weight of "Emulphor O. N." and 20 parts by weight of butadiene. This mixture was agitated vigorously for 7 hours at a temperature of 41° C. At the end of this time interval, the pressure was released, to remove the unpolymerized butadiene, and a substantial yield of an elastic tough rubber-like polymer was obtained. This material was compounded with sulfur according to the above recipe and found to have an adequtae tensile strength and elongation.

EXAMPLE 7

A similar mixture was prepared consisting of 40 parts by weight of a 50% solution of zinc chloride in water together with 0.1 part by weight of "Emulphor O. N." and 15 parts by weight of butadiene and 5 parts by weight of styrene. This mixture, likewise, was agitated vigorously for a time interval of 17 hours at a temperature of 41° C. At the end of this time interval, the pressure was released, the unreacted butadiene distilled out and the unreacted styrene was removed by a current of steam. The latex was then coagulated with isopropyl alcohol and the yield was found to be 45% of the original olefinic materials of a tough, elastic rubbery polymer. This polymer, upon compounding with sulfur, and curing, likewise showed a good tensile strength, a good elongation.

It may be noted that in Examples 5 and 6 the polymerization time was relatively very short and, while the polymers were obtained in reasonably good percentage yield a much higher percentage yield could have been obtained if the polymerization time had been longer or higher temperatures had been employed.

Thus, the invention consists in a polymerization reaction for olefinic materials in emulsion in the presence of a water solution of an active halide catalyst to produce in good yield a rubber-like polymer having good tensile strength, good elongation and good flex characteristics.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. In a process for polymerizing butadiene and acrylonitrile, the steps in combination, of dissolving a Friedel-Crafts active halide catalyst, comprising zinc chloride, in water, in a concentration between 20% and 75% of the catalyst substance on the whole solution, adding to the solution an emulsifying agent, adding the butadiene and acrylonitrile thereto, and polymerizing to a high molecular weight polymeric material through the agency of the water solution of Friedel-Crafts catalyst.

2. In a process for polymerizing butadiene and styrene, the steps in combination, of dissolving a Friedel-Crafts active halide catalyst in water, in a concentration between 20% and 75% of the catalyst substance on the whole solution, adding to the solution an emulsifying agent, comprising a neutral emulsifier, adding the butadiene and styrene thereto, and polymerizing to a high molecular weight polymeric material through the agency of the water solution of Friedel-Crafts catalyst.

3. In a process for polymerizing butadiene and acrylonitrile, the steps, of dissolving a Friedel-Crafts active halide catalyst in water, in a concentration between 20% and 75% of the catalyst substance on the whole solution, adding to the solution an emulsifying agent, comprising a condensation product of a high molecular weight aliphatic alcohol with ethylene oxide, adding the butadiene and acrylonitrile thereto, and polymerizing to a high molecular weight polymeric material through the agency of the water solution of Friedel-Crafts catalyst.

4. In a process for polymerizing a butadiene-1,3, the steps, of dissolving a Friedel-Crafts active halide catalyst in water, in a concentration between 20% and 75% of the catalyst substance on the whole solution, adding to the solution an emulsifying agent, adding a butadiene-1,3, thereto, and polymerizing to a high molecular weight polymeric material through the agency of the water solution of Friedel-Crafts catalyst.

5. In a process for inter-polymerizing a butadiene-1,3 and a compound copolymerizable therewith in aqueous emulsion containing a single

group, the steps, of dissolving a Friedel-Crafts active halide catalyst in water, in a concentration between 20% and 75% of the catalyst substance on the whole solution, adding to the solution an emulsifying agent, adding butadiene-1,3 and acrylonitrile thereto and polymerizing the mixture of monomers to a high molecular weight polymeric material through the agency of the water solution of Friedel-Crafts catalyst.

6. In a process for inter-polymerizing a butadiene-1,3 and a compound copolymerizable therewith in aqueous emulsion containing a single

group, the steps, of dissolving a Friedel-Crafts active halide catalyst in water, in a concentration between 20% and 75% of the catalyst substance on the whole solution, adding to the solution an emulsifying agent, adding butadiene-1,3 and styrene thereto and polymerizing the mixture of monomers to a high molecular weight polymeric material through the agency of the water solution of Friedel-Crafts catalyst.

7. In a process for polymerizing chloroprene, the steps, of dissolving a Friedel-Crafts active halide catalyst in water, in a concentration between 20% and 75% of the catalyst substance on the whole solution, adding to the solution an emulsifying agent, adding the chloroprene thereto and polymerizing the chloroprene to a high molecular weight polymeric material through the agency of the water solution of Friedel-Crafts catalyst.

8. In a process for polymerizing a butadiene-1,3, the steps, of dissolving a Friedel-Crafts active halide catalyst, comprising zinc chloride, in water, in a concentration between 20% and 75% of the catalyst substance on the whole solution, adding to the solution an emulsifying agent, comprising a neutral emulsifier, in the form of a condensation product of a high molecular weight aliphatic alcohol with ethylene oxide, adding a butadiene-1,3, thereto and polymerizing the butadienic material to a high molecular weight polymeric material through the agency of the water solution of Friedel-Crafts catalyst.

9. The method which comprises polymerizing an aqueous emulsion of a butadiene-1,3 by the application thereto of an aqueous solution of a Friedel-Crafts catalyst.

10. The method which comprises polymerizing an aqueous emulsion of a butadiene-1,3 by the application thereto of an aqueous solution of a Friedel-Crafts catalyst comprising zinc chloride.

11. The method which comprises polymerizing an aqueous emulsion of a butadiene-1,3 by the application thereto of an aqueous solution of a Friedel-Crafts catalyst comprising boron trifluoride.

12. The method which comprises polymerizing an aqueous emulsion of a butadiene-1,3 by the application thereto of an aqueous solution of a Friedel-Crafts catalyst comprising stannic chloride.

13. The method which comprises polymerizing an aqueous emulsion of a butadiene-1,3 by the application thereto of an aqueous solution containing between 20% and 75% based on the total solution of a Friedel-Crafts catalyst.

14. The method which comprises emulsifying a butadiene-1,3 in water with the aid of a neutral emulsifying agent and polymerizing the resultant emulsion by the application thereto of an aqueous solution of a Friedel-Crafts catalyst.

15. The method which comprises emulsifying a butadiene-1,3 in water with the aid of a neutral emulsifying agent and polymerizing the resultant emulsion by the application thereto of an aqueous solution of a Friedel-Crafts catalyst and promoting the polymerization reaction by the presence of a polymerization catalyst capable of liberating oxygen under the reaction conditions.

16. The method which comprises emulsifying a butadiene-1,3 in water with the aid of a neutral emulsifying agent and polymerizing the resultant emulsion by the application thereto of an aqueous solution of a Friedel-Crafts catalyst and modifying the polymerization by the presence of an aliphatic mercaptan to yield a high molecular weight rubbery polymer.

17. The process as defined in claim 16 wherein the polymerization catalyst capable of liberating oxygen is potassium persulfate.

18. The method which comprises emulsifying a butadiene-1,3 in water with the aid of a neutral emulsifying agent and polymerizing the resultant emulsion by the application thereto of an aqueous solution containing between 20% and 75% based on the total solution of a Friedel-Crafts catalyst and promoting the polymerization reaction by the presence of a polymerization catalyst capable of liberating oxygen under the reaction conditions.

HENRY B. KELLOG.
WILLIAM J. SPARKS.